US011776369B2

(12) United States Patent
Serino et al.

(10) Patent No.: US 11,776,369 B2
(45) Date of Patent: Oct. 3, 2023

(54) ACOUSTIC DETECTION OF SMALL UNMANNED AIRCRAFT SYSTEMS

(71) Applicant: Applied Research Associates, Inc., Albuquerque, NM (US)

(72) Inventors: Robert M. Serino, Albuquerque, NM (US); Mark J. McKenna, Albuquerque, NM (US); John Haas, Albuquerque, NM (US)

(73) Assignee: Applied Research Associates, Inc., Albuquerque, NM (US)

(*) Notice: Subject to any disclaimer, the term of this patent is extended or adjusted under 35 U.S.C. 154(b) by 98 days.

(21) Appl. No.: 17/339,447

(22) Filed: Jun. 4, 2021

(65) Prior Publication Data

US 2021/0383665 A1 Dec. 9, 2021

Related U.S. Application Data

(60) Provisional application No. 63/036,575, filed on Jun. 9, 2020.

(51) Int. Cl.

| | |
|---|---|
| ***H01Q 1/12*** | (2006.01) |
| ***G08B 13/196*** | (2006.01) |
| ***G08B 13/16*** | (2006.01) |
| ***G08G 5/00*** | (2006.01) |
| *G01S 3/14* | (2006.01) |

(52) U.S. Cl.

CPC ... *G08B 13/19676* (2013.01); *G08B 13/1672* (2013.01); *G08G 5/0073* (2013.01)

(58) Field of Classification Search

USPC ........................................................ 348/152

See application file for complete search history.

(56) References Cited

U.S. PATENT DOCUMENTS

| | | | |
|---|---|---|---|
| 4,811,308 A | 3/1989 | Michel | |
| 7,162,043 B2 | 1/2007 | Sugiyama et al. | |
| 7,532,541 B2 | 5/2009 | Govindswamy et al. | |
| 9,275,645 B2 | 3/2016 | Hearing et al. | |
| 9,965,936 B1 * | 5/2018 | Epps | G08B 21/02 |
| 10,716,292 B1 * | 7/2020 | Fox | B64C 31/024 |
| 10,944,573 B1 * | 3/2021 | Eisenmann | G06K 9/6215 |
| 11,079,303 B1 * | 8/2021 | Mishra | G01M 5/0075 |

(Continued)

FOREIGN PATENT DOCUMENTS

WO 2017077348 A1 5/2017

*Primary Examiner* — Nigar Chowdhury

(74) *Attorney, Agent, or Firm* — Erise IP, P.A.

(57) ABSTRACT

Systems and methods of non-line-of-sight passive detection and integrated early warning of an unmanned aerial system by a plurality of acoustic sensors are described. In some embodiments, the plurality of acoustic sensors is positioned within an intra-netted array in depth according to at least one of a terrain, terrain features, or man-made objects or structures. The acoustic sensors are capable of detecting and tracking unmanned aerial systems in non-line-of-sight environments. In some embodiments, the acoustic sensors may be in communication with internal electro-optical components or other external sensors, with orthogonal signal data then transmitted to remote observation stations for correlation, threat determination and if required, mitigation. The unmanned aerial systems may be classified by type and a threat level associated with the unmanned aerial system may be determined.

20 Claims, 7 Drawing Sheets

(56) References Cited

U.S. PATENT DOCUMENTS

| | | | | |
|---|---|---|---|---|
| 11,097,856 | B1 * | 8/2021 | Mishra | B64C 39/024 |
| 11,107,360 | B1 * | 8/2021 | Kimchi | G01S 13/878 |
| 11,410,299 | B2 * | 8/2022 | Turov | G08G 5/0082 |
| 11,594,142 | B1 * | 2/2023 | Cleckler | G01W 1/02 |
| 2015/0345907 | A1 * | 12/2015 | Varga | G01S 13/867<br>89/41.05 |
| 2018/0035606 | A1 * | 2/2018 | Burdoucci | A01D 34/84 |
| 2018/0157259 | A1 * | 6/2018 | Myslinski | G05D 1/0088 |
| 2019/0088156 | A1 * | 3/2019 | Choi | G09B 9/003 |
| 2019/0228667 | A1 * | 7/2019 | Matsumoto | G08G 5/0026 |
| 2020/0064443 | A1 * | 2/2020 | Yoon | B64C 39/024 |
| 2020/0108923 | A1 * | 4/2020 | Smith | B64D 47/08 |
| 2020/0108924 | A1 * | 4/2020 | Smith | F41H 13/0043 |
| 2020/0108925 | A1 * | 4/2020 | Smith | G05D 1/0094 |
| 2020/0162489 | A1 * | 5/2020 | Bar-Nahum | H04L 63/1433 |
| 2020/0300579 | A1 * | 9/2020 | Baumgartner | F41G 3/08 |
| 2020/0334961 | A1 * | 10/2020 | Kaindl | G08B 5/002 |
| 2021/0063120 | A1 * | 3/2021 | Taveniku | B64C 39/024 |

* cited by examiner

ACOUSTIC DETECTION OF SMALL UNMANNED AIRCRAFT SYSTEMS

RELATED APPLICATIONS

This application claims priority benefit of U.S. Provisional Application No. 63/036,575, filed Jun. 9, 2020, and entitled "ACOUSTIC DETECTION OF SMALL UNMANNED AIRCRAFT SYSTEMS," which is herein incorporated by reference in its entirety.

BACKGROUND

1. Field

Embodiments of the invention relate to systems and methods for detecting small unmanned aerial systems. More specifically, embodiments of the invention relate to the employment of intra-netted acoustic detection of small unmanned aerial systems in 360-degrees of terrain-independent coverage with multiple radii in depth.

2. Related Art

Typical systems and methods of detecting Unmanned Aerial Systems (UAS) employ radar, visible optics, thermal optics and/or radio frequency detection. However, small UAS still may elude these line-of-sight detection methods as they can fly nap-of-the-earth, leverage terrain features for cover and concealment, and/or move unpredictably within high clutter, low-altitude areas. Furthermore, UAS may be extremely difficult to detect using radar and/or electro-optical systems. The current UAS detection methods are line-of-sight. Therefore, the current methods do not allow for detection in complex urban settings, behind hills, and in valleys where attacking UAS may hide. Furthermore, when a UAS is in line-of-sight, the cross-section of the UAS may be reduced drastically based on the orientation of the UAS to the radar signal and the materials used for construction. The tactical measures may be used by attacking UAS and decrease the confidence in detecting the UAS using radar and/or electro-optical systems. Further, small UAS have small thermal and visible signatures, are quiet, and can easily be mistaken for birds. These drawbacks of current detection methods make it very difficult to accurately detect and/or identify UAS threats when they move fast at low-altitude in highly cluttered non-line-of-sight conditions.

Further enhancing the problem is that small UAS are readily available, man-portable, inexpensive, capable of carrying small payloads of sensors, munitions and/or contraband, and the world-wide market is expected to grow continuously. Any person may acquire and modify UAS. These conditions create the basis for a capability whereby a UAS may be flown in restricted zones and be outfitted with destructive payloads such as explosives and/or chemical, biological, or radiological materials. Further, many national governments, non-government organizations, and terrorist organizations are experimenting with and employing small UAS for a host of purposes. The abundance of UAS combined with the difficulties in identifying and tracking the UAS creates a need for Counter-Small Unmanned Aerial Systems (C-sUAS) strategies and capabilities.

What is needed is a system that accurately and reliably detects that UAS are present, determines if they are a threat, provides integrated early warning, engages the UAS, and does so regardless of terrain and/or terrain features, natural or man-made, under both line-of-sight and non-line-of-sight conditions within a redundant, layered construct and in doing so, minimizes constant hands-on attention until a triggering event. Systems and methods utilizing acoustic sensors, and acoustic sensor arrays, may provide more accurate detection and identification of UAS. Further, the passive nature of acoustics reduces risk of being targeted by threat actors or forces. Thus, detection and identification of UAS by acoustics may provide for a more reduced-risk environment. Measuring acoustic signal characteristics of UAS may provide accurate identification methods such that the UAS may not be confused with other friendly systems. Further, when compared to a database of acoustic signatures, the type of UAS may be identified. Further still, an array of acoustic sensors may be utilized to determine a number of UAS, the position and velocity of the UAS for tracking, and display and engagement of the UAS. The systems and methods for detecting UAS using acoustic sensor described herein may provide more accurate and reliable detection and identification of UAS under a full range of operating conditions. Detection and identification of UAS may provide for a safer environment.

SUMMARY

Embodiments of the invention solve the above-mentioned problems by providing systems and methods for non-line-of-sight passive detection and integrated early warning of UAS by a connected set of acoustic sensors. In some embodiments, the set of acoustic sensors detect non-line-of-sight UAS, trigger other sensors to actively detect, store, and transmit data. In some embodiments, the system also comprises acoustic sensors with integrated electro-optical imaging components operated in an orthogonal manner for further enhancing confidence in detection of UAS. In some embodiments, the systems may track and record the UAS by visual sensors, and automatically initiate engaging the UAS with weaponry.

A first embodiment of the invention is directed to a method of non-line-of-sight passive detection and integrated early warning of an unmanned aerial system, the method comprising the steps of positioning a plurality of geo-located acoustic sensors in depth within an intra-connected array according to at least one of a terrain, terrain features, or man-made objects or structures, receiving, from at least one acoustic sensor of the plurality of acoustic sensors, an acoustic signal, and comparing a signal indicative of at least a portion of the acoustic signal with known characteristic signals to classify a source of the acoustic signal, wherein the known characteristic signals include information indicative of unmanned aerial systems.

A second embodiment of the invention is directed to a system for non-line-of-sight passive detection and integrated early warning of an unmanned aerial system, the system comprising a plurality of geo-located acoustic sensors in depth within an intra-connected array according to at least one of a terrain, terrain features, or man-made objects or structures, at least one acoustic sensor of the plurality of acoustic sensors receiving an acoustic signal, and a processor. The system also comprises acoustic sensors with integrated electro-optical imaging components operated in an orthogonal manner for further enhancing confidence in detection of UAS. The system further comprises one or more non-transitory computer-readable media storing computer-executable instructions that, when executed by the processor, perform a method of classifying a source of the acoustic signal. The method comprises the step of comparing a signal indicative of at least a portion of the acoustic signal with known characteristic signals to classify the source of the acoustic signal, wherein the known characteristic signals include information indicative of unmanned aerial systems.

A third embodiment of the invention is directed to a system for non-line-of-sight passive detection and integrated early warning of an unmanned aerial system, the system comprising a plurality of geo-located acoustic sensors in depth within an intra-connected array according to at least one of a terrain, terrain features, or man-made objects or structures, at least one acoustic sensor of the plurality of acoustic sensors receiving an acoustic signal, and a processor. The system also comprises acoustic sensors with integrated electro-optical imaging components operated in an orthogonal manner for further enhancing confidence in detection of UAS. The system further comprises one or more non-transitory computer-readable media storing computer-executable instructions that, when executed by the processor, perform a method of classifying a source of the acoustic signal. The method comprises the steps of comparing a signal indicative of at least a portion of the acoustic signal with known characteristic signals to classify the source of the acoustic signal, wherein the known characteristic signals include information indicative of unmanned aerial systems and determining a threat level of the source of the acoustic signal based at least in part on the classification of the source of the acoustic signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
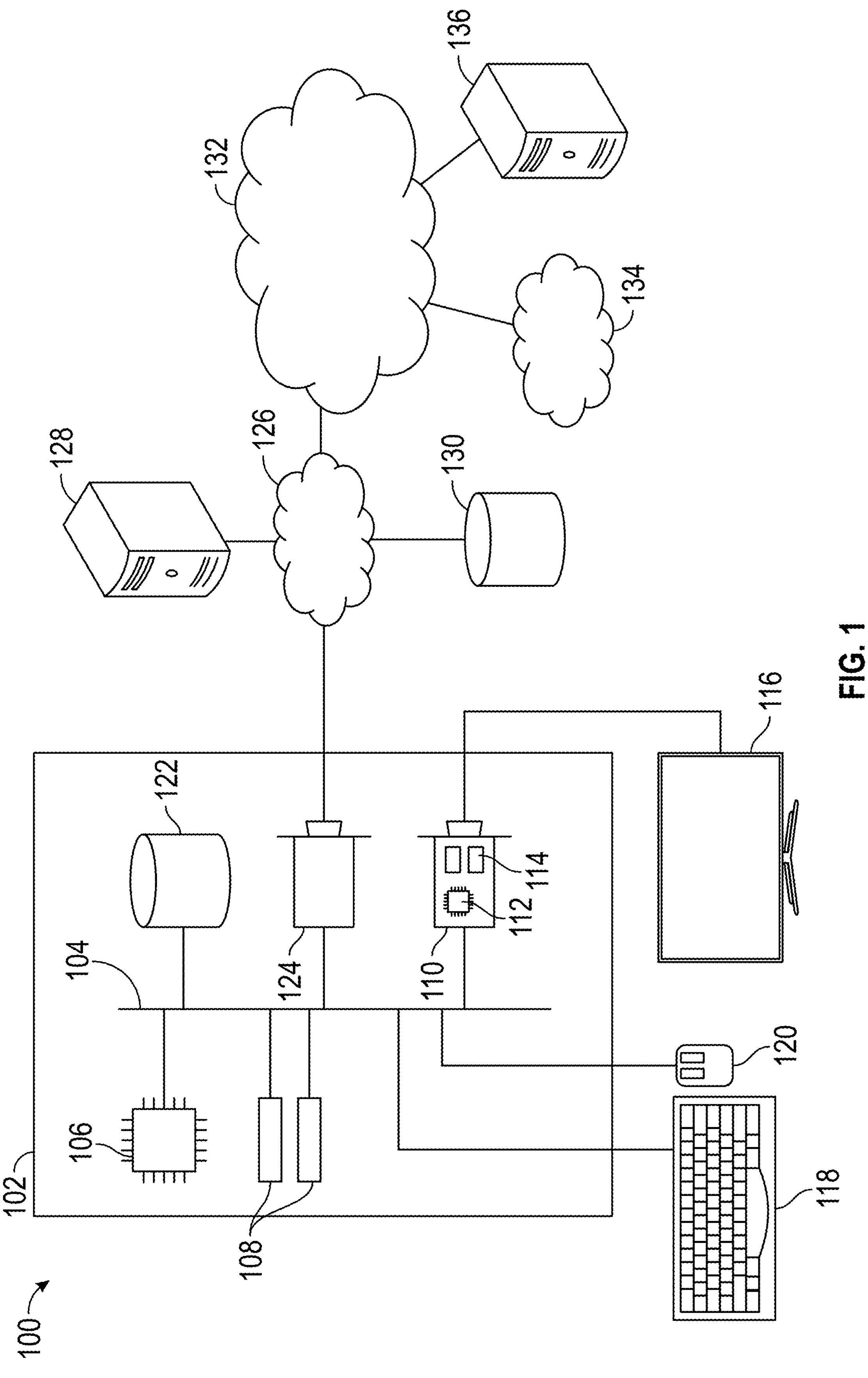
FIG. 1 depicts an exemplary hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the field by providing a method and system for passively detecting UAS. In some embodiments, acoustic sensors may be arranged in arrays. The acoustic sensors may detect vibrations in the air and ground as derived from UAS propeller rotations. The signal measured by the acoustic sensors may be compared to a database of known sensors to determine the source of the signal and if the source of the signal is friendly or a possible threat. In some embodiments, acoustic sensors may have integrated electro-optical imaging components operated in an orthogonal manner for further enhancing confidence in detection of UAS. In some embodiments, detection of the UAS may trigger additional sensors and systems and methods for countering the threat.

Though UAS are described in embodiments herein, it should be recognized that any vehicle may be detected and recognized. For example, the vehicle may be any aircraft such as a UAS, an airplane, a helicopter, and any other aerial vehicle. Though, exemplary small UAS are discussed herein, the UAS may be any size and weight. Similarly, the vehicle may be any ground-based vehicle such as, for example, an automobile, manned vehicle, unmanned vehicle, military, civilian, and any other ground-based vehicle. Similarly, a water-based vehicle may be detected and recognized such as a motorboat, sailboat, hydrofoil, submarine, and any other water-based vehicle. The systems and methods described herein are not limited to small UAS.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Turning first to FIG. 1, an exemplary hardware platform 100 that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
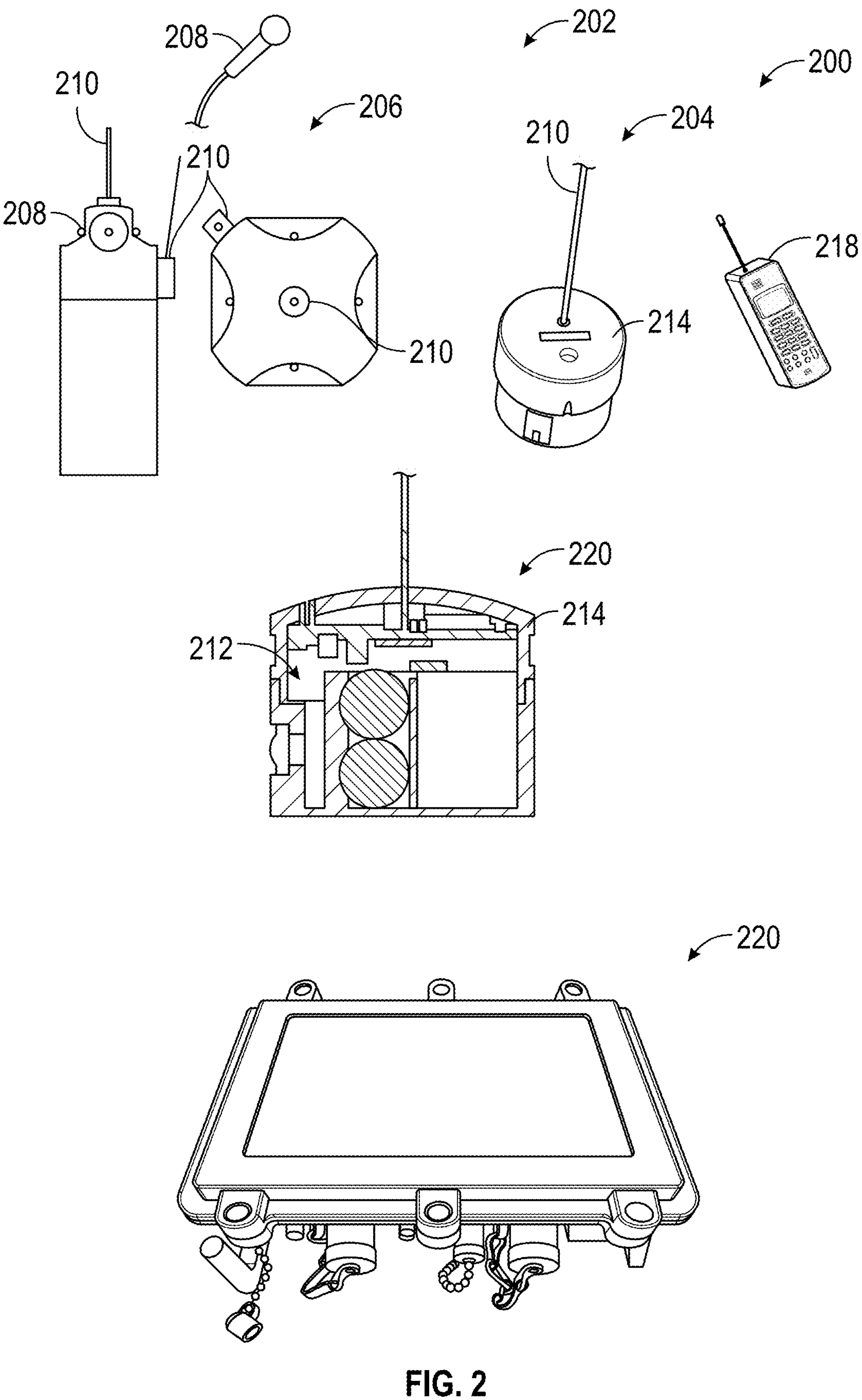
FIG. 2 depicts an exemplary acoustic detection system for implementing embodiments of the invention.

FIG. 2 depicts an exemplary acoustic detection system 200 for carrying out methods described herein. In some embodiments, acoustic detection system 200 may comprise or be in communication with the above-described hardware platform 100. Additionally, acoustic detection system 200 may comprise at least one acoustic sensor configured to detect vibrations in the ground and/or in the air. Acoustic detection system 200 may also comprise circuitry and/or electronics comprising receivers, transmitters, processors, power sources, and memory storing non-transitory computer-readable media for performing methods described herein. Acoustic detection system 200 may comprise various sound-detecting sensors. Two exemplary acoustic sensors 202 are depicted in FIG. 2. In embodiments, a plurality of acoustic sensors 202 operating in concert may be employed in the acoustic detection system.

Acoustic sensors 202 may comprise different battery capacities determining length of time in operation without replacement or maintenance. First sensor 204 may be a sensor capable of remaining in the field without battery replacement or maintenance for two years or more. Second sensor 206 may contain a smaller shorter battery life and may remain operational for up to six months. First sensor 204 and second sensor 206 are exemplary, and the life of the battery of acoustic sensors 202 may be dependent on the type of battery and additional power consuming components. Acoustic sensors 202 may comprise a power management system that allows acoustic sensors 202 to remain in a low-power state until triggered by the detection of an external sound. The power management system may allow acoustic sensors 202 to remain deployed for extensive periods without battery replacement. In some embodiments, acoustic sensors 202 may be connected to wired power and may remain operational indefinitely.

As depicted, second sensor 206 is larger than first sensor 204. In some embodiments, different battery types may be used based on the use of acoustic sensors 202. For example, first sensor 204 may be used in proximity to an airport. There may be no restriction on when first sensor 204 may be maintained and batteries replaced. Consequently, first sensor 204 may be maintained without concern. Alternatively, second sensor 206 may be used within a high-risk region of interest, such as in a military environment where access is restricted. It may be dangerous to access the location of second sensor 206 and, therefore, the battery may be much larger to decrease the timing period for maintenance. In high threat regions, second sensor 206 may comprise up to a 2-year operational window. Furthermore, acoustic sensors 202 may include power input such that acoustic sensors 202 may be directly coupled to an external power source.

In some embodiments, acoustic sensors 202 may be positioned in an intra-netted layout, or array, and share a power source that may be a battery or be directly connected to a nearby facility. In the intra-netted layout (or array), at least one of the acoustic sensors 202 is communicatively coupled (i.e., connected) to at least one other acoustic sensor. In some embodiments, each of the acoustic sensors 202 in the intra-netted layout is communicatively connected to all of the other sensors. The "intra-netted" layout as used herein is intended to encompass one or more sensors communicatively connected to one or more other sensors in a plurality of sensors arranged in an array for non-line-of-sight passive detection. Such communicative connection may be obtained via a local area network, Bluetooth, WiFi, or any other presently known or future wired or wireless communication means.

In some embodiments, acoustic sensors 202 may comprise microphones 208 capable of detecting small vibrations in the air. Microphones 208 may be configured to detect desired sounds while filtering sounds that may not be desirable. As depicted on first sensor 204, microphones 208 may be disposed on an outer surface, or housing 214. Microphones 208 may be arranged to individually or collectively detect 360 degrees around first sensor 204. Furthermore, microphones 208 may be slightly set back and partially covered by housing 214 such that noise from wind or other ambient sounds is reduced. In some embodiments, microphones 208 may be completely exposed and mounted on a stand or at a separate location from first sensor 204 and be communicatively connected by wire or wirelessly. In some embodiments, microphones 208 may be any of polar, cardioid, omnidirectional, figure eight, and any other type of microphone depending on the arrangement and the target direction. Furthermore, in some embodiments, noise cancelling or noise reduction devices may be used to filter known noises prior to detection by microphones 208. For example, baffling, foam, windscreen, and any other noise cancellation devices may be added based on the expected noises in the environment in which microphones 208 are placed. In some embodiments, microphones 208 may be condenser or diaphragm and may be micro-electromechanical system (MEMS) microphones.

An exemplary sensor interior is depicted in FIG. 2. In some embodiments, first sensor 204 and second sensor 206 may comprise a housing 214 and interior components 212. In some embodiments, the interior components 212 may comprise accelerometers, gyroscopes, position sensors (e.g., GPS, RFID, laser range finders), electrically coupled diaphragms (microphones), MEMS, processors, memory, transceivers, antenna, power sources, electro-optical imaging components, and any other electronics necessary for embodiments of processes described herein. Additionally, the interior components 212 may include any combination of the components of hardware platform 100 as described in regard to FIG. 1.

In some embodiments, some components may be exterior and may be communicatively connected to acoustic sensors 202 by electrical ports or by transceivers. For example, in some embodiments, GPS receiver 218 may be positioned at a single location and the acoustic sensors 202 may comprise laser range finders that determine a range between GPS receiver 218 and acoustic sensors 202. In some embodiments, GPS receiver 218 may be positioned at a central server, or data management system. Furthermore, GPS receiver 218 may be positioned at a different location than acoustic sensors 202 if acoustic sensors 202 are under overhead cover resulting in intermittent reception. In some embodiments, position sensors such as, for example, GPS, proximity sensors such as Bluetooth, Radio Frequency Communication (e.g., RFID tags), laser range finders, or any other position sensors may be used to determine the position of the acoustic sensors 202. The position sensors may be used to determine the global coordinates of acoustic sensors 202 as well as the relative location of each sensor to a region of interest and other sensors. Any components included in first sensor 204 may also be included in second sensor 206. Though first sensor 204 is referenced in embodiments described herein, it should be understood that second sensor 206 may include the same or similar components and perform the same or similar function.

In some embodiments, the acoustic sensors 202 may also comprise memory, or local storage 122, containing a database of characteristic signals for comparing to detected acoustic signals. Signals indicative of friendly aircraft and UAS may be stored as non-threats, and signals indicative of small UAS that are not known or known to be unfriendly may be stored as possible threats, or known threats. Furthermore, other phenomena such as, for example, general aviation aircraft, commercial aircraft, ground vehicles, traffic, or any other usual and natural phenomenon common to the environment in which the acoustic sensors 202 are placed, may be stored for comparison to received acoustic signals. Furthermore, algorithms for filtering certain types of noises may be stored. For example, wind, rain, snow, and other environmental conditions may create characteristic signals that may be used to train machine learning algorithms. Once the characteristic signals are learned, the machine learning algorithm may classify a signal as, for example, rain, wind, earthquake, or any other natural or man-made non-threat signals. Once the non-threat signals are classified, the non-threat signals may either be filtered or canceled as described in more detail below.

Acoustic sensors 202 may comprise transceiver antenna 210 for transmitting and receiving communication from various communication devices. As depicted in FIG. 2, transceiver antenna 210 may be positioned anywhere on acoustic sensors 202 that may facilitate compact arrangement of interior components 212 as well as unobstructed communication. Transceiver antenna 210 may be positioned on the side of acoustic sensors 202, on top, or may be positioned separately from acoustic sensors 202 and connected by wire. Positioning transceiver antenna 210 separately from acoustic sensors 202 may reduce noise in the electrical signals from the acoustic detection components (e.g., microphones 208) to be analyzed as well as provide a location for better communication with transceiver antenna 210.

In some embodiments, mobile communication device 220 may be used in combination with acoustic sensors 202 and in communication with transceiver antenna 210. Mobile communication device 220 may receive any communication from acoustic sensors 202 including data from electro-optical sensors, acoustic sensors, and any alerts or notifications. In some embodiments, mobile communication device 220 may be any system comprising hardware platform 100 as described above and depicted in FIG. 1. Mobile communication device 220 may be a personal computer, laptop, tablet, phone, or any other mobile computing device. Mobile communication device 220 may comprise user inputs for receiving input from the user for communication with acoustic sensors 202. The user may operate mobile communication device 220 to change modes of acoustic sensors 202 or check any notifications. In some embodiments, notifications may comprise system errors, low power, time in service, or any other maintenance-type issues. In some embodiments, notifications may comprise detection of UAS, transmission of signals to activate other sensors, transmission of recorded acoustic signals, and the like. In some embodiments, acoustic sensors may include integrated electro-optical imaging components operated in an orthogonal manner for further enhancing confidence in detection of UAS especially for non-line-of-sight and other complex environmental conditions. The user may manage all sensor activity with mobile communication device 220 without having to directly interact with acoustic sensors 202. The operation of mobile communication device 220 may allow the user to download and upload any data (e.g., machine training data, system configuration data, noise characteristics data) wirelessly without directly contacting acoustic sensors 202.

Figure 3:
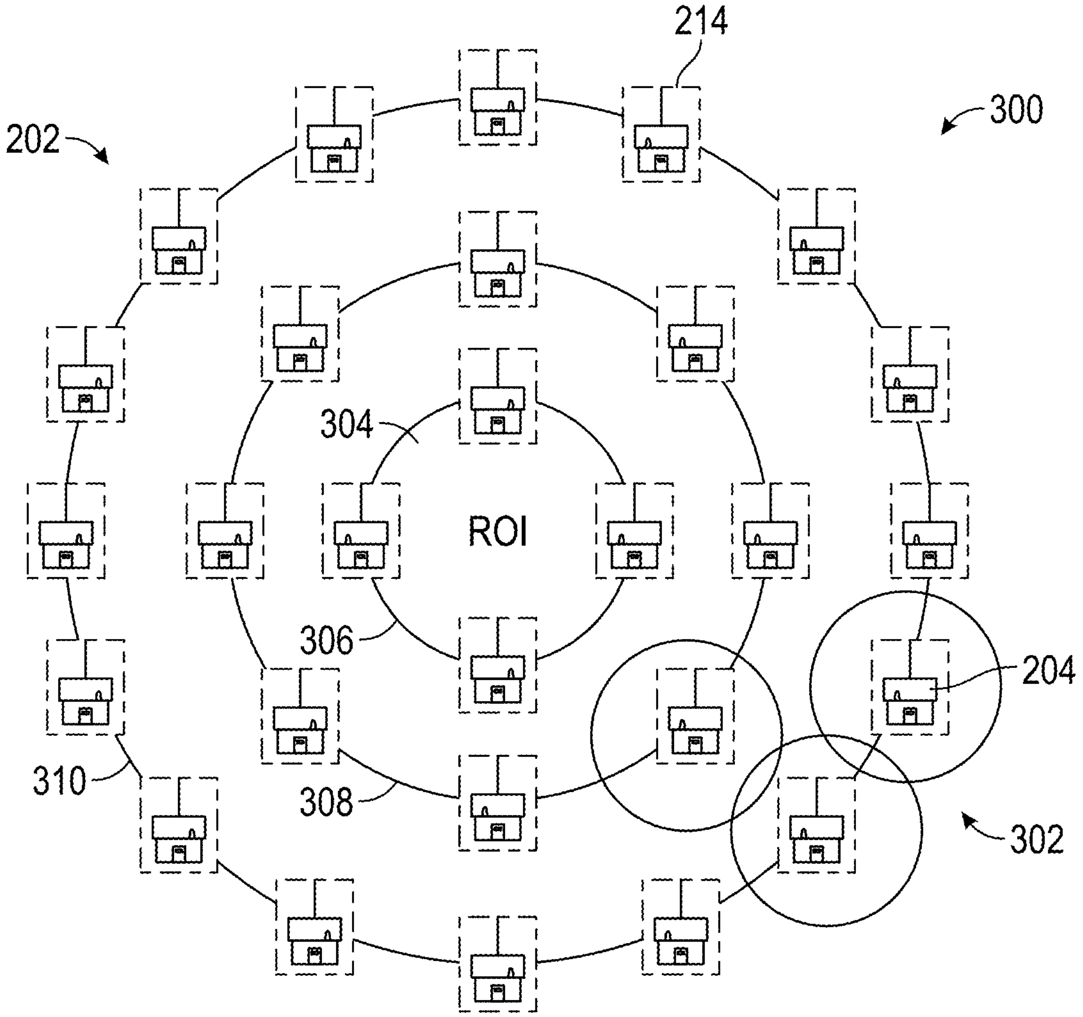
FIG. 3 depicts an embodiment of a sensor array.

FIG. 3 depicts an exemplary sensor array 300 that may be an intra-netted layout of geo-located acoustic sensors 202 for detecting line-of-sight and non-line-of-sight acoustic signals. In some embodiments, region of interest (ROI) 304 may be a location that is near, surrounded, or otherwise protected by acoustic sensors 202. For example, ROI 304 may be an airport, military base, stadium, prison, business, person, or any other object that may be in close proximity and protected by acoustic sensors 202. As depicted, acoustic sensors 202 comprise an intra-netted array of a plurality of first sensor 204. When a UAS is detected by acoustic sensors 202, the UAS position may be estimated by the level of the sound, an intensity of the vibration of the received signal, and a time received and initially correlated with other sensors located within sensor array 300. This sensing is further correlated and risk-reduced by detections and real-time integrated analyses from other sensors also on the net. If the UAS type is known, from a comparison of the received signal to stored characteristic signal data, the signal level may be used to determine a distance from first sensor 204. When a plurality of acoustic sensors 202 detect the UAS, a precise location of the UAS may be determined by combining the distances in a triangulation method described in more detail below. Further parameters may be determined based on the sensor information. For example, when the positions are detected over time, the velocity, acceleration, and a future trajectory of the UAS may be determined. In some embodiments, these parameters may be used in tracking and targeting statistical algorithms described in more detail below.

Complete coverage of ROI 304 may require discrete sensor placements at a number of sensor positions that are non-line-of-sight from a central point and may be optimally placed to account for complex terrain, terrain features, other cluttering conditions, and/or man-made objects so as to achieve assured coverage for operations in depth from a central point. Sensor array 300 may be arranged such that a UAS may not be able to penetrate the perimeter without being detected by acoustic sensors 202. For example, acoustic sensors 202 may be arranged such that detectable areas 302 around each sensor may overlap as shown. Placement of acoustic sensors 202 such that detectable areas 302 overlap prevents cracks for UAS to breach detectable areas 302 without being detected.

In an exemplary scenario, ROI 304 is a possible target of terrorism. ROI 304 may be any protected facility such as, for example, a government building, prison, national border, power plant, oil field, military facility or other critical infrastructure. Acoustic sensors 202 may be placed around ROI 304 such that all sides may be protected. As shown in FIG. 3, a perimeter may be established such that any UAS that comes within an established proximity of the ROI 304 are detected. As depicted in FIG. 3, an inner perimeter 306 may have a radius of 0.5 kilometers, an intermediate perimeter 308 may have a radius of 1 kilometer, and an outer perimeter 310 may have a radius of 2 kilometers or more. Though each perimeter has a set radius, the radius may be any conditions-based distance and may be dependent on the sensitivity of the acoustic sensors 202 and the arrangement of the acoustic sensors 202. For example, the acoustic sensors 202 may have a probability of detecting UAS within a certain range. A radius around the first sensor 204 may be established that is directly related to the probability of detection of the UAS as shown with the detectable areas 302. For example, within the detection radius of the detectable areas 302, the first sensor 204 may detect the UAS 99% of the time. To ensure that a UAS within the perimeter is detected, the detection radius for each adjacent sensor may overlap as shown. This provides a high probability that UAS entering the perimeter will be detected. The sensor array 300 may be established based on the sensitivity of the acoustic sensors 202 and the expected UAS to be detected.

Figure 4:
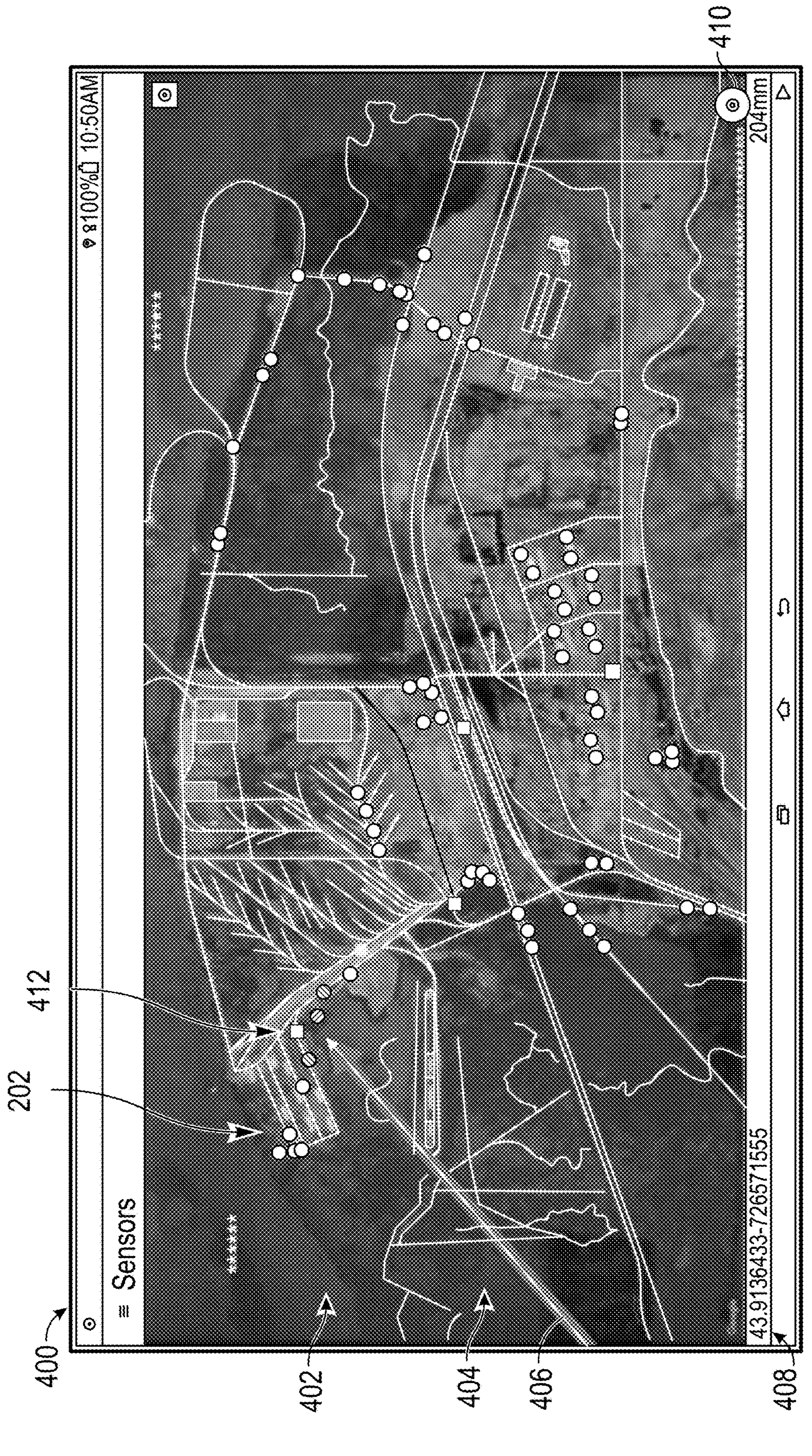
FIG. 4 depicts an exemplary user interface presenting an embodiment of a terrain-based layout of acoustic sensors.

Though a circular array of acoustic sensors 202 is depicted in FIG. 3, any arrangement of the acoustic sensors 202 may be imagined. Acoustic sensors 202 are depicted in FIG. 4 comprising terrain-based sensor array 402 displayed via an exemplary graphical user interface (GUI) 400. Terrain-based sensor array 402 may be a layout according to terrain and environmental conditions. Acoustic sensors 202 may be arranged in a manner that is consistent with the terrain such as on a mountainside, in canyons, on banks of rivers, and any other location that may be line-of-sight restricted. As such, terrain-based sensor array 402 may be an intra-netted array as described above, but without the symmetric arrangement. If the relative locations of acoustic sensors 202 are known, the arrangement may not need to be symmetric. Acoustic sensors 202 may be place on water such as, for example, on buoys and anchored such that the acoustic sensors 202 move with the waves on the water. Acoustic sensors 202 may be placed in any arrangement that may provide the best coverage such that UAS may not pass without detection.

In some embodiments, acoustic sensors 202 may be arranged along the uneven terrain such that the UAS may be detected without line-of-sight electromagnetic sensors. A symmetric arrangement of the acoustic sensors 202 is not necessary as long as the location of each sensor is known. This can be achieved by GPS sensors on the acoustic sensors or simply by recording and storing the relative location of each sensor. For more precise, location information, range measurement devices may be disposed on the acoustic sensors 202 or at the location of the acoustic sensors 202. For example, each acoustic sensor may be enabled by laser range finding for determining precise distance from a known location. This may provide extremely accurate location information for the acoustic sensors such that the UAS location may also be accurately determined. Because acoustic sensors 202 may not move, the location may be recorded and stored one time such that each sensor does not have to be equipped with a location detection device.

Continuing with the exemplary embodiment described above where terrorists use a swarm of UAS to attack ROI 304, tactics may be used to hide UAS from detection. As depicted ROI 304 is an airfield being attacked by a swarm of UAS. For example, the swarm of UAS may be programed to hide from line-of-sight detection using canyons, hills, buildings, vegetation, riverbanks, and any other cover. Acoustic sensors 202 may be positioned to detect the UAS when line-of-sight detection methods are diminished or not workable. In the exemplary scenario depicted by GUI 400, mountain area 404 may be mountainous terrain, and the swarm of UAS may be represented by the path 406. The closest sensors, identified with cross lines, may detect the swarm of UAS first. When a sensor of acoustic sensors 202 detects an acoustic signal, the sensor may wake from low-power state where the sensor is just listening. Upon waking, the sensor may then compare the received signal with stored characteristic signals and classify the signal as particular type of UAS and a threat level. If the signal is determined to be a threat the sensor may signal transmit data to the other sensors of acoustic sensors 202. The data transmitted to the other sensors may just wake the other sensors such that the other sensors process acoustic signals, or the data transmitted may comprise the classifications and the signal information such that the other sensors know what to listen for and know that the signal source has already been classified as a threat.

In some embodiments, the transmitted data is received by mobile communication device 220 or at a remote observation station that may be located at ROI 304 (e.g., the airfield). GUI 400 may be displayed via mobile communication device 220 to a user in the field or at any remote observation station. GUI 400 may display any map data that may be open source and locations of acoustic sensors 202 may be displayed on the map. GUI 400 may display location coordinates 408 or any other location indication. Any sensor that detects the acoustic signal may indicate as such by changing color, blinking, changing size, or by any other method. Furthermore, an indicia 410 may be displayed by GUI 400 indicating that an acoustic signal is detected. Furthermore, the indicia 410 may be indicative of a threat level by color, size, shape, texture, blinking, or any other method.

In some embodiments, acoustic sensors 202 may be coupled with and trigger other sensors. The sensors may detect a threat as described in embodiments above and send a signal to additional sensors to be begin recording, processing, storing, and transmitting. The additional sensors may be acoustic sensors in the intra-netted array; however, in some embodiments, the additional sensors may be combined with the sensor and detect various other phenomena associated with the source of the sound vibration. For example, the additional sensors may be optical. In some embodiments, the data transmitted by acoustic sensors may trigger line-of-sight sensors such as, for example, RADAR, video cameras, still image cameras, thermal imaging cameras, electro-optical infrared, and any other cameras that may detect electromagnetic radiation across and wavelength of the spectrum. The alternative sensor may also transmit data to remote observation stations for visual tracking and identification by personnel. In some embodiments, the remote observation station may be a central control station for providing power to and facilitating communication between acoustic sensors 202. The data may be transmitted in near real time such that the personnel may monitor the changing situation and may provide quick real-time response. For example, an array of acoustic sensors 202 may be disposed at a military airfield ROI 304 as described in embodiments above. In some embodiments, the acoustic sensors 202 may be couple with a parabolic microphone for detecting over long ranges in specific directions. For example, line-of-sight sensors such as, for example, radar and cameras may be used for threat detection across a large area; however, mountain area 404 may obscure the line-of-sight sensors. Acoustic sensors 202 may be directed toward the valley for specific acoustic detection in the direction of the mountains. As such, acoustic sensors 202 may detect the acoustic signal associated with the UAS before the line-of-sight sensors and acoustic sensors 202 may transmit to the other sensors to begin recording, processing, and transmitting.

In some embodiments, the data by acoustic sensors 202 may be used to provide visual virtual reality (VR) simulations for display to tactical groups. As described above, acoustic sensors 202 may be placed in an array and may trigger other sensors such as, for example, a video camera. In some embodiments, acoustic sensors 202 may comprise electro-optical sensors. The electro-optical data obtained by the electro-optical sensors may be transmitted with the acoustic data from acoustic sensors 202. In some embodiments, an array of video cameras, or the integrated electro-optical sensors, may be triggered and actuated to focus on the acoustic signal source which may be the UAS swarm. The video data recorded by the plurality of video cameras (e.g., electro-optical sensors) may be combined into a three-dimensional virtual and/or augmented reality (VR/AR) display of the environment. The virtual reality display of the environment may be provided at a remote location for review by personnel. In some embodiments, the VR/AR display may be provided to personnel on the ground such as, for example, military groups, fire fighters, police officers, or other emergency personnel that may be in-route or on-location.

In some embodiments, acoustic sensors 202 may transmit signals that trigger initiation of weapons-based man-in-the-loop effectors generally referenced as weapons 412 that engage the UAS. Weapons 412 may be any engagement device that may use sound, electromagnetic radiation, projectiles, and explosives to incapacitate the acoustic signal source. For example, the swarm of UAS may approach the military airfield described above. The swarm of UAS may approach out of sight of line-of-sight detection devices such as optical cameras and radar. The UAS may be detected by acoustic sensors 202 of acoustic detection system 200. Acoustic sensors 202 may detect the sound (i.e., acoustic signal) of the UAS and transmit the signal indicative of the UAS sound to at least one processor that may classify the sound of the UAS and determine a threat level as described in embodiments herein. When it is determined that the UAS pose a threat, weapons 412 may be activated and supplied a position of the detected UAS. In some embodiments, weapons 412 may be a plurality of laser-emitting devices and each laser-emitting device may be activated. Each laser-emitting device may be assigned a UAS or a plurality of UAS.

In some embodiments, the target direction of the laser-emitting devices may be update in real time as the UAS is tracked. When the UAS becomes visible, the laser-emitting device may also be connected to an optical sensor, acoustic sensors 202, and any other sensor that allows the laser-emitting device to track and target the UAS using a statistical algorithm such as, for example, an extended Kalman filter. When the UAS is targeted, the laser-emitting device may engage and destroy the UAS. After a first UAS is destroyed, the laser-emitting device may move on and engage a second UAS. Laser-emitting device may move to the next closest UAS or any UAS that may pose the greatest threat or may target the UAS in any tactical manner.

In some embodiments, acoustic sensors 202 may be placed in an urban environment. Acoustic sensors 202 may be trained to detect and classify urban sounds such as, for example, conversation, traffic, animals, alarms, as well as natural sounds. Acoustic sensors 202 may be placed on buildings and towers for relative height displacement. In some embodiments, acoustic sensors 202 may be placed around and on sensitive buildings and other critical infrastructure such as, for example, government buildings, foreign embassies, prisons, defense contractor buildings, and the like. In some embodiments, the UAS may be connected to law enforcement communications and the Internet and automatically determine if there is threat. For example, the UAS may detect a swarm of UAS and determine from analyzing the news of the area that a local light show involving UAS is underway. Furthermore, the system may be notified by law enforcement communication that unknown UAS are entering secured airspace around the foreign embassy and automatically activate all sensors, begin storing information, and begin processing acoustic signals.

Figure 5:
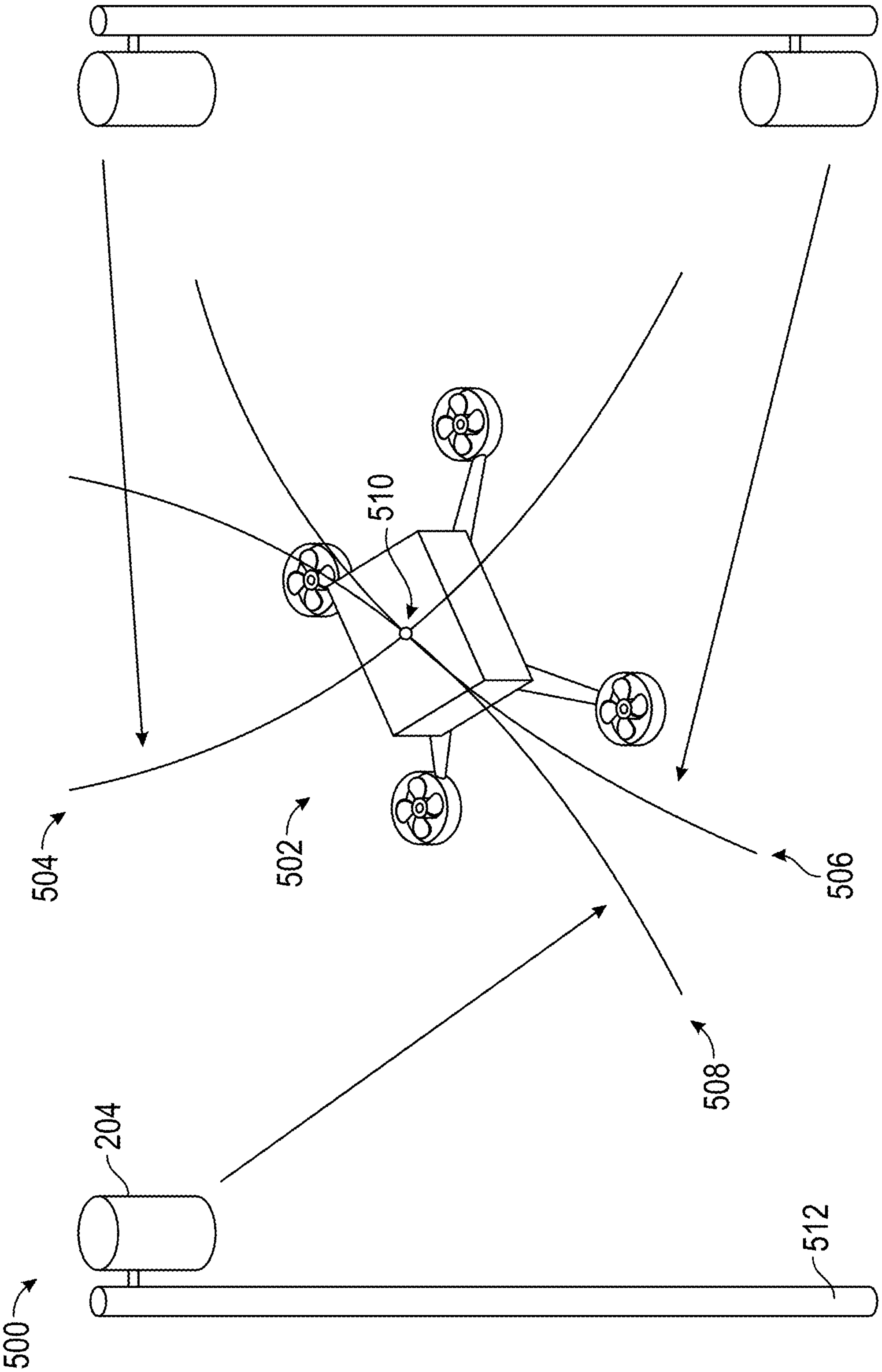
FIG. 5 depicts an embodiment of a vertical sensor array detecting a quadcopter.

In some embodiments, acoustic sensors 202 are disposed with vertical displacements as shown in FIG. 5. In some embodiments, vertical sensor array 500 may further comprise acoustic sensors 202 spaced vertically. Vertically placed acoustic sensors 202 may provide a detection of the altitude of the UAS, for example, quadcopter 502. In some embodiments, acoustic sensors 202 placed in vertical arrays as well as along the ground topography may aid in determining a three-dimensional location of the UAS. For example, the acoustic signal from quadcopter 502 traveling between acoustic sensors 202 may reach acoustic sensors 202 at different times. Knowing that the speed of sound is constant between quadcopter 502 and acoustic sensors 202, and because acoustic sensors 202 are placed at relative elevation differences, a three-dimensional location of quadcopter 502 may be determined. Each sensor may detect quadcopter 502 at a linear distance from each sensor as shown. Therefore, quadcopter 502 may lie on a sphere or at least a partial sphere as a general direction from which the acoustic signal from quadcopter 502 may be known. These spheres may be represented by first radius 504, second radius 506, and third radius 508. Point 510 represents the three-dimensional location in common with each sphere. As such, the location of point 510 is the best estimate of the location of quadcopter 502.

In some embodiments, any other sensor data may be combined with data from acoustic sensors 202 to provide a better estimate of the location of quadcopter 502. In some embodiments, the three-dimensional location of quadcopter 502 may be determined from a planar array or a sensor array that is terrain-based when the locations of acoustic sensors 202 are known; however, placing acoustic sensors 202 at elevation may provide early warning and more accurate location of higher altitude UAS as well as more accurate tracking of vertical movement of the UAS. Acoustic sensors 202 may be placed at elevation based on the terrain or may be placed at elevation on stands 512.

Figure 6:
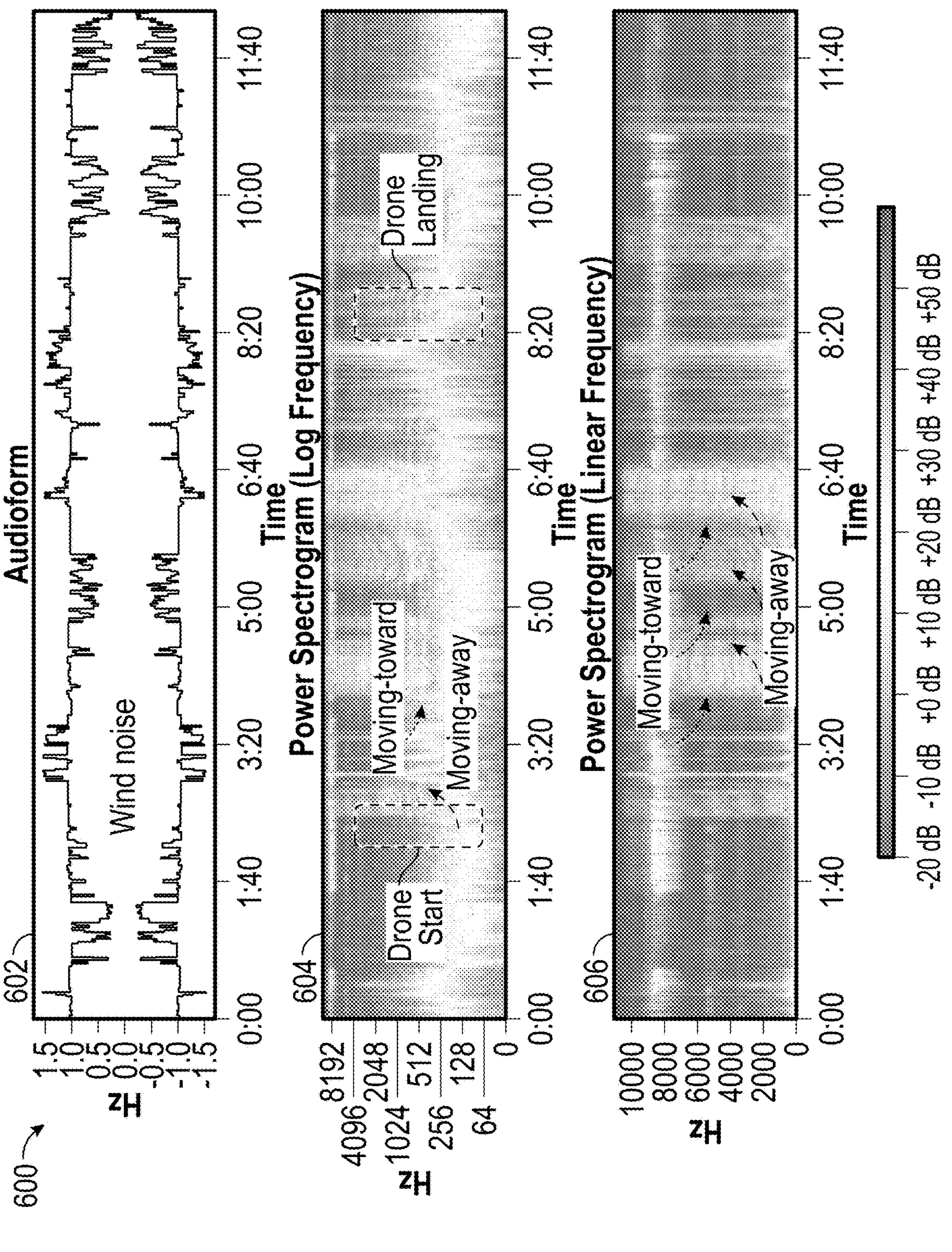
FIG. 6 depicts exemplary signal analysis of sounds detected by acoustic sensors.

Turning now to FIG. 6 depicting exemplary acoustic signal 600. In some embodiments, noise detected by microphones 208 and inherent in the electrical system may be filtered using known characteristic signals. The known characteristic signals may be acoustic signals common to an environment of ROI 304. The characteristic signals may be recorded and classified by the user or may be recorded and automatically classified based on a database of stored and pre-classified signals. The classification algorithms described herein may be trained on UAS signals, known characteristic signals, and a combination of UAS signals and known characteristic signal for robustness. For example, recordings of environmental acoustic signals may be recorded near an airport. Typical aircraft taking off and landing may be recorded and classified as known sounds. Further, the aircraft taking off and landing may be in known directions such as on runways and in periodic intervals. These known sounds may be used as training data for acoustic sensors 202. The known characteristic signals may be any rural natural acoustic signals of animals, wind, rain, leaves, or any other detectable natural sounds. Furthermore, the known characteristic signals may be any urban environmental acoustic signals such as conversation, music, alarms, traffic, and any other urban environmental sounds. These known characteristic signals may be filtered out or disregarded such that any unknown or out of the ordinary acoustic signals may be further processed for recognition and classification.

Furthermore, acoustic sensors 202 may be arranged to reduce noise as described above. A sensor that is further from the ground may reduce ground noise if the sensor is positioned near a roadway, railroad tracks, bridge, or the like. A sensor may be positioned behind a wall or building to reduce wind in a windy environment and may be configured to detect acoustic signals from a specific target direction. These processes may reduce and filter noise and friendly acoustic signals such that the acoustic detection system 200 may process the target acoustic signals.

In some embodiments, acoustic sensors 202 may detect acoustic signals and store the acoustic signals in the local storage 122. One or more non-transitory computer-readable media may be executed by at least one processor to compare the acoustic signals with a database of known characteristic signals to determine a type of acoustic sound that was detected by the acoustic sensors 202. For example, a gust of wind may be detected. Upon comparison to the database of characteristic signals it may be determined that the acoustic signal is indicative of a gust of wind, and disregard or store the acoustic signal for later comparisons. Alternatively, the acoustic signal may be compared to the database of characteristic signals, and it may be determined that the acoustic signal matches a known UAS that is in violation of flying restrictions. For example, the signal may be indicative of the quadcopter 502 turning propellers at specific RPM indicative of the size of the propellers and the weight of quadcopter 502. The characteristics of the acoustic signal may be compared to the database of characteristic signals, and it may be determined that the source of the signal (e.g., quadcopter 502) is a known threat. When an unknown signal or a known threat is detected, an alert may be transmitted notifying the authorities and personnel at ROI 304 of the threat. When an unknown signal is identified, the unknown signal may be stored as a characteristic signal for future comparisons. In some embodiments, integration of electro-optical imaging components within acoustic sensors 202 may enable real-time orthogonal sensing and deliver higher confidence detections especially under non-line-of-sight conditions. In some embodiments, orthogonal sensing may utilize any sensors described herein to cover detectable areas 302. The sensors may be arranged in any location and may be positioned to detect at any angle relative to other sensors including acute, right, and obtuse angles.

FIG. 6 depicts exemplary acoustic signal 600 received by the UAS, signal extraction, and signal analysis. In some embodiments, audio form signal 602 may comprise the acoustic signal received by acoustic sensors 202 and may be indicative of at least a portion of the acoustic signal. Audio form signal 602 may comprise all sounds received from the detectable environment including, in the case depicted, wind and UAS acoustic signals. The log frequency power spectrogram 604 depicts the extracted UAS signal with wind filtered. As the UAS increases RPM of the motor, the UAS takes off. In some embodiments, the amplitude of the acoustic signal may be indicative of relative distance between the UAS and the sensor. The increased RPM acoustic signal may be automatically recognized as the sound of the UAS and classified as such. The characteristic increase in RPM may signify that the UAS is accelerating upwards. When the UAS is classified the type of UAS as well as a weight of the UAS may be known. As such, possible propeller diameters and RPM may be used to determine flight characteristics of the UAS. Motor and propeller overtones may be extracted to determine the type and the weight of the UAS as compared to known characteristic signals. Similarly, the UAS decreasing RPM may signify that the UAS is decreasing elevation and possibly landing. No sound before or after the change in RPM may indicated takeoff and landing.

Furthermore, as shown in both log frequency power spectrum 604 and linear frequency power spectrum 606 a Doppler shift in frequency may be indicative of motion of the UAS either towards or away from acoustic sensors 202. As the UAS moves closer to the sensor the frequency may increase and as the UAS moves away from the sensor the frequency may decrease. As such, a single sensor may receive data that can be analyzed to determine motion of the UAS relative to the sensor. The Doppler motion and the increased RPM may be combined to show increased speed toward and away from the sensor.

The signals may be analyzed and classified using machine learning algorithms such that the source of the detected sound has a probability of classification associated. In some embodiments, the signal extraction may be performed in time, frequency, and wavelet domains, and the acoustic signal may be analyzed for noise, separability, repeatability, and robustness prior to further analysis. In some embodiments, acoustic signal analysis may classify by comparison to characteristic signals using exemplary statistical and machine learning algorithms such as linear discriminant analysis, distance-based likelihood ratio test, quantitative descriptive analysis, artificial neural networks, and the like.

In some embodiments, a machine learning algorithms (MLA) may be trained for signal classification. The MLA may be trained on known noises such as wind, rain, traffic, human and animal voices, foot traffic, and other non-threat noises that may be expected in the area of the sensors. Furthermore, the MLA may be trained on known and friendly aircraft and vehicles for classification of the vehicles as a non-threat classification. Similarly, the MLA may be trained on known UAS, and enemy vehicle sounds such that the MLA may be trained to detect threats with a minimum known probability. In some embodiments, the MLA provide a probability of detection and a probability of false alarms based on the classification.

In some embodiments, a threat level may be determined. The signal may be compared to the database and the source of the signal determined with a probability. The probability may be used to determine a threat level. For example, the acoustic signal may match known signal characteristics 100% and it is determined that the source of the acoustic signal is a commercial airliner. The known commercial airliner is not a threat, so the threat level is indicated as zero. Alternatively, the source of the signal may be determined to be an unknown UAS type. Because the UAS is unknown, the threat level may be 50%. As such, more information may be required. So, an action taken may be to deploy surveillance or trigger alternative sensors to determine the UAS type and determine if the UAS is a threat. In the event that the UAS is determined to be a threat, a threat level of 100% may be determined and military action taken. The action based on the threat level may be determined by threshold levels. For example, at 75% threat probability, action is taken. At 25% threat probability, surveillance is taken, and below 25%, no action is taken. The thresholds noted are examples, and any thresholds and threat levels may be used based on conditions.

Figure 7:
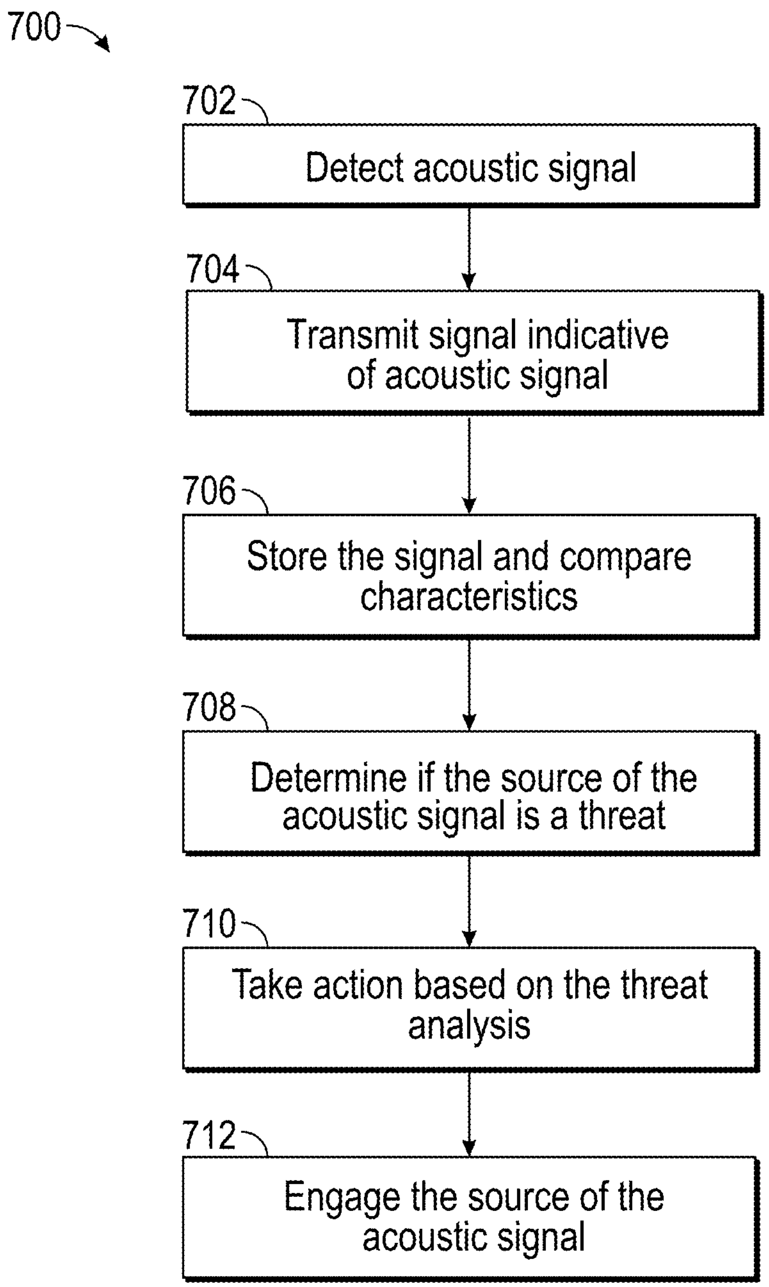
FIG. 7 depicts an exemplary flow diagram for detecting acoustic signals and determining a threat level of the source of the acoustic signals.

FIG. 7 depicts an exemplary process of detecting an acoustic signal and determining a threat level of the source of the acoustic signal generally referenced by the numeral 700. At step 702, the acoustic sensors 202 detect the acoustic signal as described in embodiments above. Acoustic sensors 202 may be or otherwise comprise at least one of a sensitive accelerometer and microphone detecting an acoustic signal, or sound, in the air. Acoustic sensors 202 may detect many acoustic signals in the air simultaneously in rural and urban environments. In some embodiments, acoustic sensors 202 may be positioned at relative heights and distances to detect UAS such that the UAS may not penetrate a detection zone of the UAS. The detection zone may be set up based on a proximity of detection for acoustic sensors 202. Acoustic sensors may be positioned across the terrain and at elevation in a three-dimensional intra-netted detection array such that location, velocity, acceleration, and future trajectory may be estimated.

At step 704, the acoustic sensors 202 may send a signal indicative of the acoustic signal to be stored and processed. The acoustic signal may be received by, for example, microphones 208, and an electrical signal indicative of the acoustic signal may be generated and sent for storage and analysis. In some embodiments, many overlapping sounds may be received and, consequently, many overlapping signals may be sent.

At step 706, the signal indicative of the acoustic signal is stored and analyzed as described in embodiments above. The characteristics of the received acoustic signal may be compared to stored characteristics of stored signals in the database. The comparison may measure error between the received signals and the stored signal characteristics using statistical and machine learning algorithms. A low error may indicate a high likelihood that the received acoustic signal is the same or similar to the stored signal. Likewise, a high error may indicate that the received acoustic signal is not the same as the characteristic signal to which the received signal is compared. The database may store a plurality of characteristic signals indicative of common sounds such as, for example, airplanes, wind, and automobiles. Further, the database may store characteristic signals indicative of known UAS threats. Therefore, the source of the acoustic signal may be determined from the acoustic signal and may be analyzed to determine if the source is a threat.

At step 708, the source of the signal is analyzed to determine if the source of the signal is a threat. In some embodiments, a likelihood of threat is determined from the comparison of the acoustic signal and the stored signal characteristics. In some embodiments and depending on line-of-sight versus non-line-of sight conditions, the acoustic signal may be compared and correlated in real-time against line-of-sight orthogonal sensor data or other non-line-of-sight sensor data such as from integrated electro-optical components within acoustic sensor 202. The likelihood determined from the comparison at step 706 may be indicative of a likelihood that the source of the acoustic signal is a threat as described in embodiments above. Furthermore, there may be thresholds for determining action based on the perceived threats. The thresholds may be low, medium, and high threat, and actions may be taken based on the likelihood of a threat compared to the thresholds.

At step 710, if the source of the acoustic signal is a threat or is unknown, an automatic action may be taken. In some embodiments, an action may be taken based on the level of threat detected compared to threshold values. For example, no action may be taken, or the signal may be disregarded if no threat is detected. A warning and signal to initiate surveillance may be taken if the signal may be a threat. Military action, or lock down, may be taken if there is a high likelihood of a threat. The thresholds may be placed at any likelihood of a threat and may be customizable by the user.

At step 712, if the object is a threat and the location is, to some degree, known, additional actions may be taken such as, for example, triggering other area sensors and initiating man-in-the-loop weapons engagement 412. In some embodiments, optical sensors may be triggered and provided the location of the source of the acoustic signal such that the optical sensors may observe the source. Furthermore, any sensors data may be used for tracking the vehicle. In some embodiments, man-in-the-loop weapons 412 may be triggered to engage and mitigate the threat. Any sensors and man-in-the-loop weapons 412 may be used to track, engage and mitigate the source of the threat acoustic signal. Though man-in-the-loop weapons are described herein, in some embodiments, weapons may be automatically triggered to mitigate the threat.

Although the invention has been described with reference to the embodiments illustrated in the attached drawing figures, it is noted that equivalents may be employed, and substitutions made herein without departing from the scope of the invention.

The invention claimed is:

1. A method of non-line-of-sight passive detection and integrated early warning of an unmanned aerial system, the method comprising:

positioning a plurality of acoustic sensors in an array under a range of potential flight paths according to at least one of a terrain, terrain features, or man-made objects or structures so as to passively ping on threat motion and threat vectors;

receiving, from at least one acoustic sensor of the plurality of acoustic sensors, an acoustic signal;

determining a flight profile state of the unmanned aerial system including take-off and landing;

determining flight characteristics of the unmanned aerial system including motor revolution rate and rotor speed;

determining a type and a weight of the unmanned aerial system from the flight characteristics; and determining that the unmanned aerial system is a threat based at least in part on the type and the weight.

2. The method of claim 1, wherein the array is an intra-netted array, such that each acoustic sensor of the plurality of acoustic sensors is communicatively coupled with at least one other sensor of the plurality of acoustic sensors.

3. The method of claim 2, activating an integrated and internal or external electro-optical video camera associated with the at least one acoustic sensor to record video data of the unmanned aerial system;

transmitting the video data to a remote observation station; and displaying the video data of the unmanned aerial system.

4. The method of claim 1, further comprising combining data from the plurality of acoustic sensors with at least one other sensor to determine a position and a velocity of a source of the acoustic signal.

5. The method of claim 4, further comprising transmitting, when the type of the unmanned aerial system is classified as the threat, relevant characteristics of the threat, the position and the velocity of the unmanned aerial system to the at least one other sensor.

6. The method of claim 5, further comprising:

tracking a change in the position of the unmanned aerial system as the unmanned aerial system moves throughout the plurality of acoustic sensors; and engaging the source of the acoustic signal with a weapon.

7. The method of claim 1, wherein the at least one acoustic sensor is communicatively coupled with at least one other acoustic sensor of the plurality of acoustic sensors by a central control station, and wherein the at least one acoustic sensor is disposed at a vertical distance relative to the at least one other acoustic sensor.

8. A system for non-line-of-sight passive detection and integrated early warning of an unmanned aerial system, the system comprising:

a plurality of acoustic sensors positioned in an array under a range of potential flight paths according to at least one of a terrain, terrain features, or man-made objects or structures so as to passively ping on threat motion and threat vectors;

at least one processor; and one or more non-transitory computer-readable media storing computer-executable instructions that, when executed by the at least one processor, perform a method of classifying a source of an acoustic signal, the method comprising:

detecting the acoustic signal by at least one acoustic sensor of the plurality of acoustic sensors;

determining a flight profile state of the unmanned aerial system including take-off and landing;

determining flight characteristics of the unmanned aerial system including motor revolution rate and rotor speed;

determining a type and a weight of the unmanned aerial system from the flight characteristics; and determining that the unmanned aerial system is a threat based at least in part on the type and the weight.

9. The system of claim 8, wherein the method further comprises:

filtering out known environmental acoustic signals.

10. The system of claim 9, wherein the acoustic signal is a first signal;

further comprising a remote observation station; and wherein the method further comprises transmitting a second signal to activate a warning at the remote observation station based on the determining that the unmanned aerial system is the threat.

11. The system of claim 10, wherein the remote observation station is a portable communication device; and wherein the method further comprises:

activating a video camera to record video data of the unmanned aerial system;

transmitting the video data to the portable communication device; and displaying the video data of the unmanned aerial system.

12. The system of claim 8, wherein the method further comprises combining data from the plurality of acoustic sensors with at least one other sensor to determine a position and a velocity of the source of the acoustic signal.

13. The system of claim 12, further comprising at least one of an electromagnetic radiation sensor and a weapon, and wherein the method further comprises transmitting, when the type of the unmanned aerial system is classified as the threat, relevant characteristics of the threat, the position and the velocity of the unmanned aerial system to at least one of the electromagnetic radiation sensor and the weapon.

14. The system of claim 13, wherein the method further comprises:

tracking a change in the position of the unmanned aerial system as the unmanned aerial system moves throughout range the plurality of acoustic sensors; and automatically engaging the unmanned aerial system with the weapon based at least in part on the threat.

15. A system for non-line-of-sight passive detection and integrated early warning of an unmanned aerial system, the system comprising:

a plurality of acoustic sensors positioned in an array according to at least one of a terrain, terrain features, or man-made objects or structures;

at least one acoustic sensor of the plurality of acoustic sensors receiving an acoustic signal;

at least one processor; and one or more non-transitory computer-readable media storing computer-executable instructions that, when executed by the at least one processor, perform a method of classifying a source of the acoustic signal, the method comprising:

detecting the acoustic signal by the at least one acoustic sensor of the plurality of acoustic sensors;

determining a flight profile state of the unmanned aerial system including take-off and landing;

determining flight characteristics of the unmanned aerial system including motor revolution rate and rotor speed;

determining a type and a weight of the unmanned aerial system from the flight characteristics;

determining that the unmanned aerial system is a threat based at least in part on the type and the weight, wherein the acoustic array is always active, and activating at least one non-acoustic sensor for tracking the unmanned aerial system based at least in part on the determining that the unmanned aerial system is the threat.

16. The system of claim 15, wherein the method further comprises:

detecting a location and a velocity of the source of the unmanned aerial system by the at least one non-acoustic sensor.

17. The system of claim 16, wherein the method further comprises:

transmitting data indicative of the unmanned aerial system to a remote observation station; and receiving, from the remote observation station, instructions to engage the unmanned aerial system with at least one weapon.

18. The system of claim 16, further comprising an electromagnetic radiation sensor; and a remote observation station;

wherein the method further comprises displaying data from the electromagnetic radiation sensor, by a display, at the remote observation station.

19. The system of claim 15, wherein the array is an intra-netted array, such that the at least one acoustic sensor of the plurality of acoustic sensors is communicatively coupled with at least one other sensor of the plurality of acoustic sensors by a central control station.

20. The system of claim 15, wherein classifying the unmanned aerial system and the determining of the type of the unmanned aerial system is performed by at least one machine learning algorithm trained on characteristic acoustic signals of unmanned aerial systems.

* * * * *